(12) United States Patent
Kang et al.

(10) Patent No.: US 8,182,160 B2
(45) Date of Patent: May 22, 2012

(54) LENS BARRIER APPARATUS

(75) Inventors: Hyun-jin Kang, Suwon-si (KR);
Dong-sung Hur, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 12/720,010

(22) Filed: Mar. 9, 2010

(65) Prior Publication Data

US 2011/0013279 A1    Jan. 20, 2011

(30) Foreign Application Priority Data

Jul. 20, 2009    (KR) .................. 10-2009-0065891

(51) Int. Cl.
*G03B 9/08* (2006.01)

(52) U.S. Cl. ....................... 396/452; 396/471

(58) Field of Classification Search ............. 396/452, 396/471, 486, 493
See application file for complete search history.

(56) References Cited

U.S. PATENT DOCUMENTS

| | | | | |
|---|---|---|---|---|
| 7,350,989 B2* | 4/2008 | Tanaka et al. | ................. | 396/448 |
| 7,738,035 B2* | 6/2010 | Oishi et al. | .................... | 348/374 |
| 2004/0027476 A1* | 2/2004 | Masuda | ........................ | 348/335 |
| 2010/0322616 A1* | 12/2010 | Hirabayashi et al. | ......... | 396/448 |

* cited by examiner

*Primary Examiner* — Rodney Fuller
*Assistant Examiner* — Linda B Smith
(74) *Attorney, Agent, or Firm* — Drinker Biddle & Reath LLP (57) ABSTRACT

A lens barrier apparatus which includes a barrier base; an interlocking ring configured to rotate with respect to the barrier base; a pair of driving vanes, each of which is configured to be rotatably mounted to the barrier base, and each of which is configured to be rotatably moved from an open position to a closed position by movement of the interlocking ring; and a pair of reacting vanes each of which is rotatably mounted to the barrier base, and each of which is configured to rotate from the closed position to the open position by movement of a respective driving vane of the pair of driving vanes.

26 Claims, 8 Drawing Sheets

LENS BARRIER APPARATUS

CROSS-REFERENCE TO RELATED PATENT APPLICATION

This application claims the benefit of Korean Patent Application No. 10-2009-0065891, filed on Jul. 20, 2009, in the Korean Intellectual Property Office, the entire disclosure of which is incorporated herein by reference.

BACKGROUND OF THE INVENTION

1. Field of the Invention

The present invention relates to a lens barrier apparatus, and more particularly, to a lens barrier apparatus for protecting a lens unit installed in a camera.

2. Description of the Related Art

Lens barrier apparatuses are apparatuses for protecting a lens unit installed in a camera from contact with objects from outside the apparatus. In lens barrier apparatuses, the number of barrier vanes is determined according to an outer diameter of a barrel and a lens viewing angle. When barrier vanes have a single-layer structure, higher stability can be obtained than when barrier vanes have a multi-layer structure in which many barrier vanes overlap. However, miniaturization, higher magnification, and wider viewing angles have resulted in many barrier vanes being arranged to overlap each other to form a two or more-layered structure. And, when the optical pathway of the image of a subject is opened using many overlapping barrier vanes, the optical pathway may be incompletely opened and some of the barrier vanes may obstruct the optical pathway.

SUMMARY OF THE INVENTION

The present invention provides a lens barrier apparatus including a supporting structure constructed to ensure that a barrier vane is located in an opening position to prevent the barrier vane from invading an effective viewing angle.

According to an aspect of the present invention, there is provided a lens barrier apparatus including: a pair of driving vanes, each of which has a first hole and a second hole and rotates about a rotary shaft inserted into the first hole to open and close an optical path while reacting to the movement trajectory of a power shaft inserted into the second hole; and a pair of reacting vanes which rotates between an opening position and a closing position in synchronization with the pair of driving vanes, wherein, in the opening position, the power shaft contacts the pair of reacting vanes.

The pair of driving vanes and the pair of reacting vanes may be together assembled with the rotary shaft, and the pair of driving vanes overlap with the pair of reacting vanes.

In the closing position, the power shaft may be spaced apart from the pair of reacting vanes.

Each of the pair of reacting vanes includes: a first projection allowing the each of the pair of reacting vanes to rotate in synchronization with rotation of a corresponding driving vane of the pair of driving vanes when the corresponding driving vane rotates in an opening direction; and a second projection allowing the each of the pair of reacting vanes to rotate in synchronization with rotation of the corresponding driving vane when the corresponding driving vane rotates in a closing direction.

For example, in the opening position, the reacting vane may contact the first projection.

For example, the power shaft may contact a notched edge of each of the pair of reacting vanes, or a bottom surface of each of the pair of reacting vanes.

For example, a portion of each of the reacting vanes which contacts the power shaft may have a concave shape matching the shape of the power shaft.

The lens barrier apparatus may further include: a barrier base on which a rotary shaft is formed and which is fixedly mounted; an interlocking ring which is rotatably installed on the barrier base and on which the power shaft is formed; and a driving ring for driving the interlocking ring.

The driving ring may include an engaging portion, and the interlocking ring may include a recess into which the engaging portion is inserted.

The recess may extend in a length longer than a length of the engaging portion so that the recess rotates with respect to the engaging portion in a predetermined angle range.

The lens barrier apparatus may further include a closing spring interposed between the interlocking ring and the driving ring, wherein the closing spring provides an elastic bias to the engaging portion toward a first end position of the recess.

The lens barrier apparatus may further include an opening spring interposed between the interlocking ring and the barrier base, wherein the opening spring provides an elastic bias to the interlocking ring in an opening direction.

According to an aspect of the present invention, there is provided a lens barrier apparatus including: a barrier base on which a pair of rotary shafts are formed and which is fixedly mounted; an interlocking ring which is rotatably installed on the barrier base and on which a pair of power shafts is formed; a pair of driving vanes, each of which has a first hole and a second hole and rotates about a corresponding rotary shaft of the pair of rotary shafts, which is inserted into the first hole, to open and close an optical path while reacting to the movement trajectory of a corresponding power shaft of the pair of power shafts, which is inserted into the second hole; and a pair of reacting vanes which rotate between an opening position and a closing position in synchronization with the pair of driving vanes; wherein, in the opening position, the pair of power shafts contacts the pair of reacting vanes.

The pair of driving vanes and the pair of reacting vanes may be together assembled with the rotary shaft and the pair of driving vanes overlaps with the pair of reacting vanes.

In the closing position, the pairs of power shafts may be spaced apart from the pair of reacting vanes.

For example, a portion of each of the pair of reacting vanes, which contacts each of the pair of power shafts, may have a concave shape matching the shape of each of the pair of power shafts.

Each of the driving rings may include an engaging portion, and each of the interlocking rings may include a recess into which the engaging portion is inserted.

The recess may extend in a length longer than a length of the engaging portion so that the recess rotates with respect to the engaging portion in a predetermined angle range.

The lens barrier apparatus may further include a closing spring interposed between the interlocking ring and the driving ring, wherein the closing spring provides an elastic bias to the engaging portion toward a first end position of the recess.

The lens barrier apparatus may further include a driving ring for driving the interlocking ring in a closing direction.

The lens barrier apparatus may further include an opening spring interposed between the interlocking ring and the barrier base, wherein the opening spring provides an elastic bias to the interlocking ring in an opening direction.

According to an aspect of the present invention, there is provided a lens barrier apparatus including: a barrier base; an interlocking ring configured to rotate with respect to the barrier base; a pair of driving vanes, each of which is configured to be rotatably mounted to the barrier base, and each of which is configured to be rotatably moved from an open position to a closed position by movement of the interlocking ring; and a pair of reacting vanes each of which is rotatably mounted to the barrier base, and each of which is configured to rotate from the closed position to the open position by movement of a respective driving vane of the pair of driving vanes.

The pair of reacting vanes may be configured to rotate from the closed position to the open position by movement of a respective driving vane of the pair of driving vanes and by movement of the interlocking ring.

In the open position, a pair of structures mounted to the interlocking ring may be in contact with the respective pair of reacting vanes to prevent the respective pair of reacting vanes from obstructing a portion of an opening formed by the open position.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
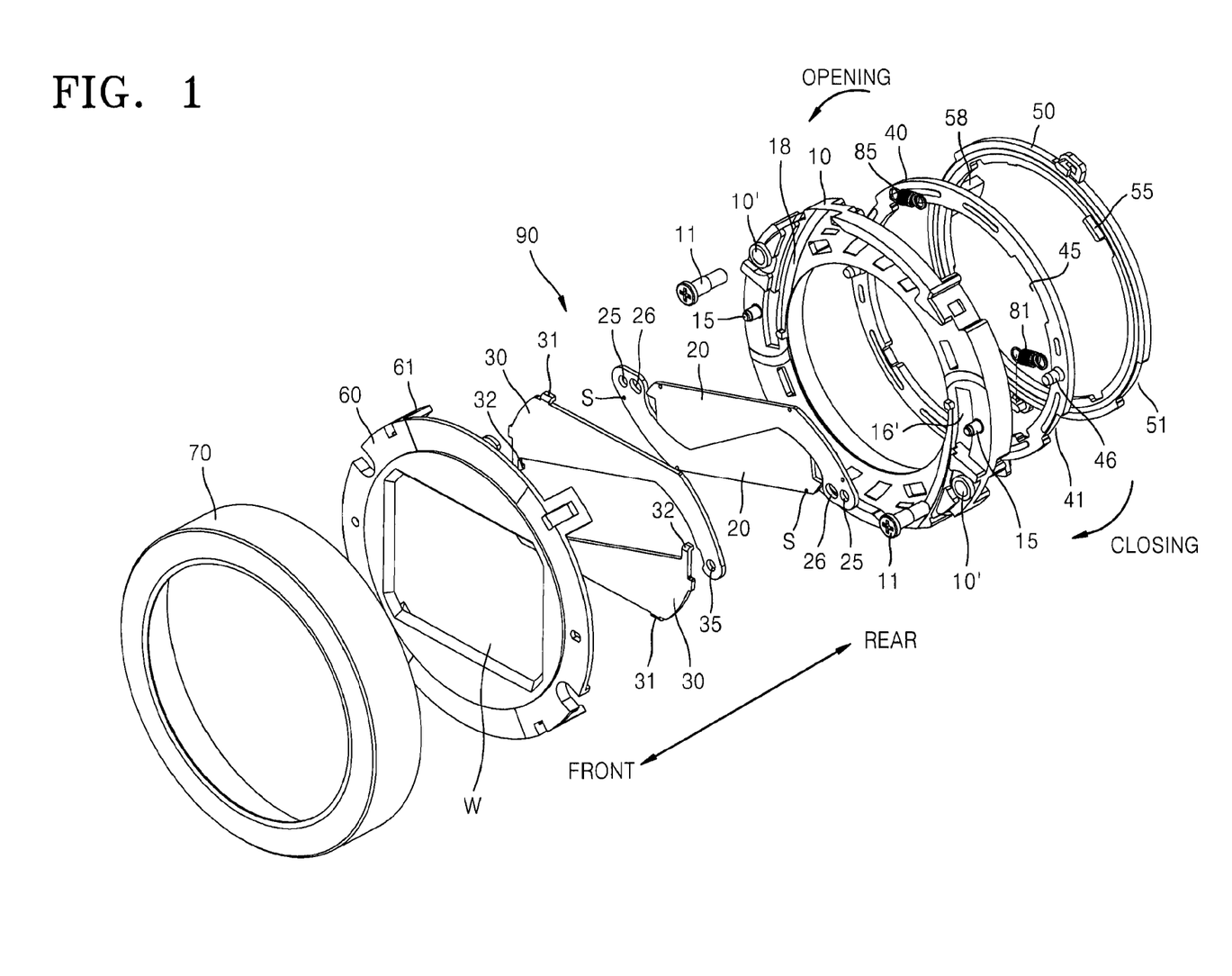
FIG. 1 is an exploded perspective view from a front side to a rear side of an example of a lens barrier apparatus.

Hereinafter, a lens barrier apparatus according to embodiments of the present invention will be described in detail with reference to the attached drawings. FIG. 1 is an exploded perspective view a front side to a rear side of an example of a lens barrier apparatus. Referring to FIG. 1, the lens barrier apparatus includes a front panel 60 defining an opening W, barrier vane 90 for opening and closing the opening W, a barrier base 10 rotatably supporting the barrier vane 90, an interlocking ring 40 for driving the barrier vane 90 to be opened or closed, and a driving ring 50 for driving the interlocking ring 40. The lens barrier apparatus is mounted on a front end of a lens barrier (not shown), and opens or closes the opening W through which the image of a subject enters.

In an embodiment, the barrier base 10 is fixedly mounted on a front end of the lens barrier by a screw member 11. And, the barrier base 10 is rotatably assembled with the barrier vane 90 so that the barrier vane 90 can open and close the opening W.

The barrier vane 90 includes two driving vanes 20 and two reacting vanes 30. In an embodiment, a first projection 31 and a second projection 32 may be formed on top and bottom ends of each of the two reacting vanes 30. The first projections 31 allow the reacting vanes 30 to rotate with the driving vanes 20 in synchronization when the driving vanes 20 rotate in an opening direction. The second projections 32 allow the reacting vanes 30 to rotate together with the driving vanes 20 in synchronization when the driving vanes 20 rotate in a closing direction. The two driving vanes 20 and the two reacting vanes 30 are fixed together by two rotary shafts 15 of the barrier base 10 while the driving vanes 20 and the reacting vanes 30 overlap, so that the driving vanes 20 and the reacting vanes 30 rotate about the same rotary center. The driving vanes 20 and the reacting vanes 30 respectively include rotary shaft assembly holes 25 and 35 into which the rotary shafts 15 are inserted, respectively.

The driving vanes 20 rotate such that the opening W is open or closed when the interlocking ring 40 rotates in the opening direction or the closing direction. In an embodiment, two power shaft assembly holes 26 are formed in the driving vanes 20 in a location near the respective rotary shaft assembly holes 25 of the driving vanes 20. Two power shafts 46 of the interlocking ring 40 are inserted into the assembly holes 26. Thus, the two driving vanes 20 rotate around the two rotary shaft assembly holes 25 while reacting to the movement trajectory of the two power shafts 46, respectively. Two through-holes 16' through which the two power shafts 46 pass are formed in the barrier base 10 so that the two power shafts 46 of the interlocking ring 40 cross the barrier base 10 and are then inserted into the two driving vanes 20, respectively. The through-holes 16' may extend in a circumferential direction of the barrier base 10 so as to permit the movement trajectory of the power shafts 46.

The driving vanes 20 and the reacting vanes 30 overlap or unfold with respect to each other to open or close the opening W, and there may be a spacing between the driving vanes 20 and the reacting vanes 30 not to interrupt movements of the driving vanes 20 and the reacting vanes 30 with respect to each other. In this regard, a plurality of projections S may be formed in various locations of the driving vanes 20 and the reacting vanes 30 to obtain the spacing. Likewise, two guide grooves 18 may be formed in the barrier base 10 not to interrupt movement of the two driving vanes 20, respectively, and to obtain a spacing between the two barrier base 10 and the two driving vanes 20. The two guide grooves 18 may be formed corresponding to the movement trajectory of the two driving vanes 20, respectively.

A lever member 58 projecting towards a rear side may be formed on a side of the driving ring 50. The lever member 58 contacts a cam member (not shown) and rotates the driving ring 50 in the closing direction according to the lens barrier operation of being taken out or taken into a camera main body. The interlocking ring 40 rotates in synchronization with rotation of the driving ring 50. Specifically, an engaging portion 55, which projects towards a front side, is formed on a side of the driving ring 50, and a recess 45, in which the engaging portion 55 is caught, is formed in the interlocking ring 40. When the engaging portion 55 is caught on the recess 45, the recess 45 and the engaging portion 55 rotate as one body and thus, the interlocking ring 40 rotates in synchronization with the driving ring 50.

Figure 2:
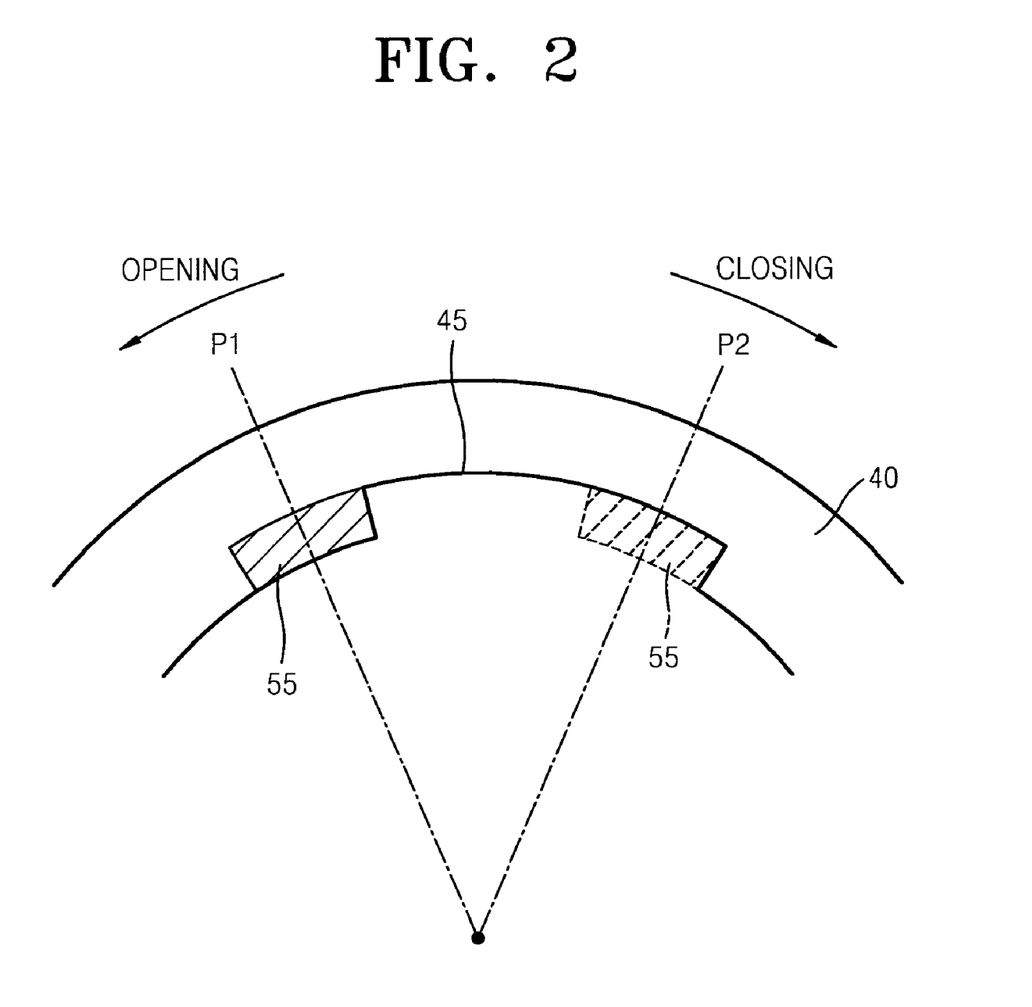
FIG. 2 is a view illustrating an assembly state of an engaging portion of an example of a driving ring and a recess of an interlocking ring in the lens barrier apparatus of FIG. 1.

FIG. 2 is a view illustrating an example of an assembly state of the engaging portion 55 of the driving ring 50 and the recess 45 of the interlocking ring 40 in the lens barrier apparatus of FIG. 1. Referring to FIG. 2, the recess 45 extends along a circumferential direction of the interlocking ring 40 so that the recess 45 houses the engaging portion 55 and rotates with respect to the engaging portion 55. In a state in which the engaging portion 55 is forced to be located in a first end position P1 of the recess 45 due to an aid force of a closing spring (see 81 of FIG. 1), the engaging portion 55 rotates in the closing direction and is moved to a second end position P2 of the recess 45, and thus, the engaging portion 55 is caught on the recess 45 and the engaging portion 55 and the recess 45 rotate as one body. In addition, in a state in which the engaging portion 55 contacts the recess 45 in the first end position P1 due to the aid force of the closing spring (see 81 of FIG. 1), when an external force is applied in the opening direction, the recess 45 allows an opening operation in response to the external force while rotating with respect to the engaging portion 55. Thus, the application of excess force to the lens barrier apparatus by the external force applied to the barrier vane 90 is prevented and also, destruction of the lens barrier apparatus is prevented. Additionally, if the external force is removed, the recess 45 rotates in the closing direction due to the aid force of the closing spring 81 and the engaging portion 55 contacts the recess 45 in the first end position P1.

Referring to FIG. 1, the barrier base 10 is coupled to the front end of the lens barrier through the interlocking ring 40 and the driving ring 50. In an embodiment, the barrier base 10 may be assembled with the lens barrier by the screw member 11 which is combined with the lens barrier through a connecting hole 10' of the barrier base 10. The interlocking ring 40 and the driving ring 50 have escape recesses 41 and 51 through which the screw member 11 passes so that the screw member 11 is combined with the lens barrier through the interlocking ring 40 and the driving ring 50. Additionally, the front panel 60 may be assembled with the front end of the lens barrier while the barrier vane 90 hinged on the barrier base 10 is interposed therebetween. The front panel 60 may have an assembling unit 61 for combining the front panel 60 with the lens barrier. A cover member 70 for good appearance may cover the front panel 60.

Figure 3:
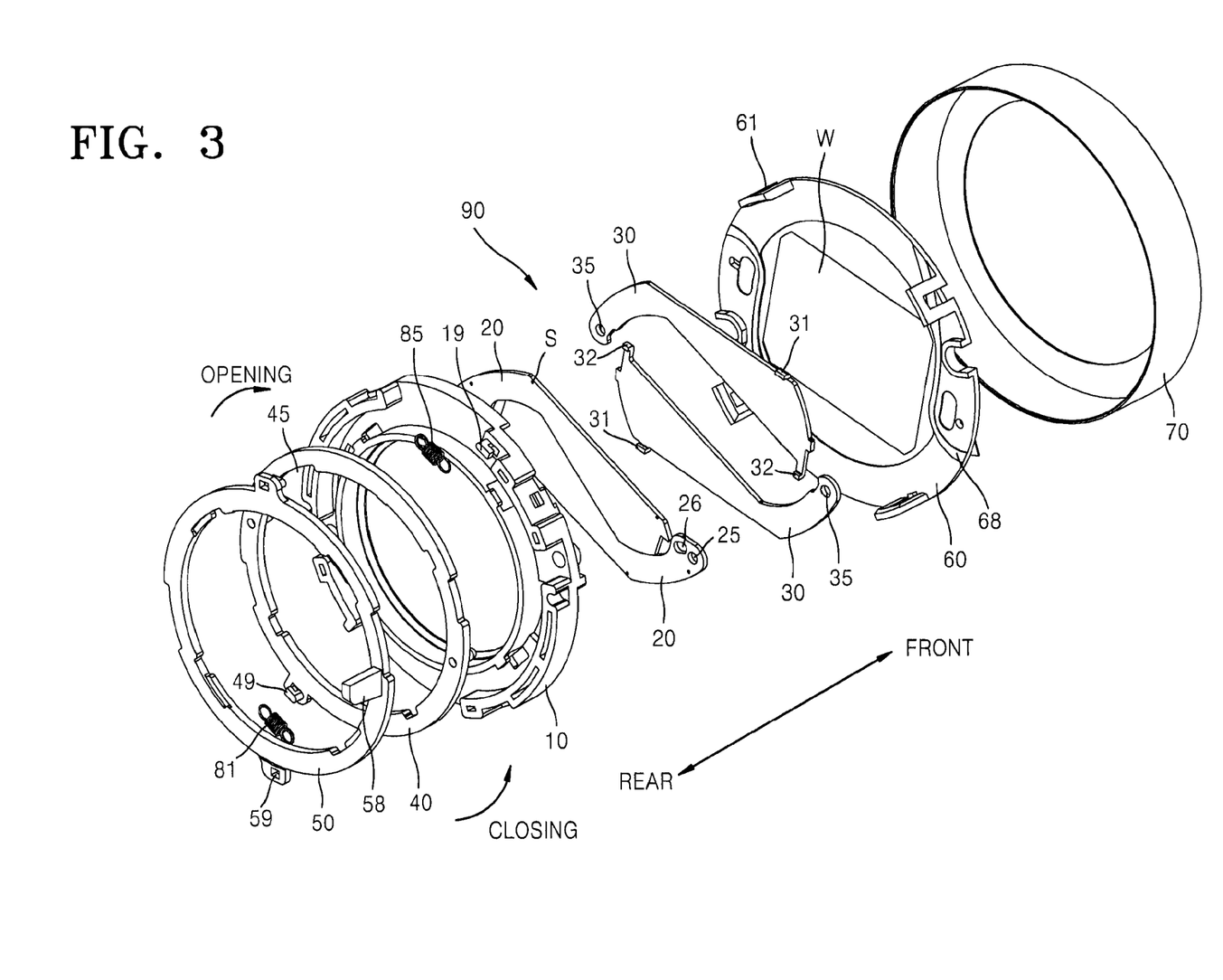
FIG. 3 is an exploded perspective view from the rear side to the front side of the lens barrier apparatus of FIG. 1.

FIG. 3 is an exploded perspective view in a direction from the rear side to the front side of the lens barrier apparatus of FIG. 1. Referring to FIG. 3, the closing spring 81 is interposed between the driving ring 50 and the interlocking ring 40. In an embodiment, the closing spring 81 is a coil-type extension spring, and provides an aid force to the interlocking ring 40 in the closing direction. An end of the closing spring 81 may be connected to a hooking portion 59 of the driving ring 50 and the other end of the closing spring 81 may be connected to a hooking portion 49 of the interlocking ring 40.

An opening spring 85 may be interposed between the interlocking ring 40 and the barrier base 10. In an embodiment, the opening spring 85 is a coil-type extension spring, and provides an aid force to the interlocking ring 40 in the opening direction. An end of the opening spring 85 may be connected to a hooking portion (not shown) of the interlocking ring 40, and the other end of the opening spring 85 may be connected to a hooking portion 19 of the barrier base 10.

In an embodiment, when photographing is finished and the lens barrier (not shown) is taken into a camera main body (not shown), the lever member 58 of the driving ring 50 is compressed and the driving ring 50 and the interlocking ring 40 rotate as one body in the closing direction. As illustrated in FIG. 2, when the engaging portion 55 is moved to the second end position P2 from the first end position P1 by the rotation of the driving ring 50, and the engaging portion 55 is caught on the recess 45, the driving ring 50 and the interlocking ring 40 rotate as one body and a closing operation is performed. In this case, due to rotation of the interlocking ring 40, the opening spring 85 extends in the circumferential direction and provides an elastic bias as an aid force in the opening direction to the interlocking ring 40, and as long as the lever member 58 is under pressure, the opening spring 85 continuously provides the elastic bias while being in an extended state.

In an embodiment, when photographing is started, the lens barrier (not shown) is taken out of the camera main body (not shown), the pressure applied to the lever member 58 of the driving ring 50 is removed and the interlocking ring 40 rotates in the opening direction due to the aid force of the opening spring 85. As illustrated in FIG. 2, an opening operation is performed by rotating the recess 45 of the interlocking ring 40 with respect to the engaging portion 55 of the driving ring 50.

Meanwhile, a guide groove 68 may be formed in the front panel 60. The guide groove 68 is formed to secure a spacing between the front panel 60 and the barrier vane 90 so as not to interrupt movement of the barrier vane 90. The guide groove 68 may be formed corresponding to the movement trajectory of the barrier vane 90.

Figure 4:
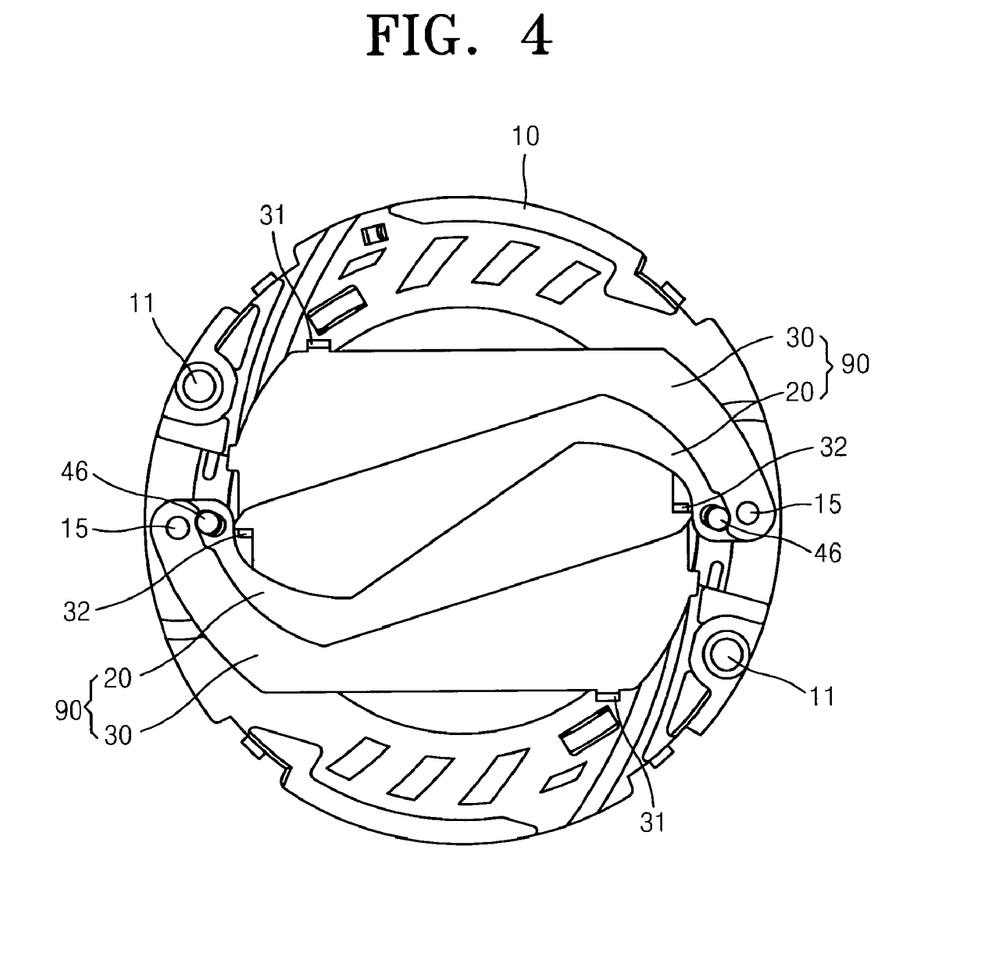
FIG. 4 is a view illustrating an assembly state of a barrier vane of the lens barrier apparatus of FIG. 1, in order to explain opening and closing of the barrier vane.

FIG. 4 is a view illustrating an assembly state of the barrier vane 90 of the lens barrier apparatus of FIG. 1, in order to explain opening and closing of the barrier vane 90. Referring to FIG. 4, the barrier vane 90 includes two driving vanes 20 and two reacting vanes 30. The two driving vanes 20 and the two reacting vanes 30 open or close an optical path of the image of a subject by rotating around the two rotary shafts 15. Specifically, the two driving vanes 20 rotate around the two rotary shafts 15 in the opening direction or the closing direction while reacting to the movement trajectory of the two power shafts 46, respectively. The rotating movement of the two driving vanes 20 is respectively transferred to the two reacting vanes 30 by the first and second projections 31 and 32 and thus, the two reacting vanes 30 rotate around the two rotary shafts 15 in the opening direction or the closing direction, respectively. As described above, the rotating movement of the reacting vanes 30 is forced by the first and second projections 31 and 32. However, the rotating movement of the two reacting vanes 30 may also be forced by the two power shafts 46, respectively, in addition to the first and second projections 31 and 32, as will now be described in detail.

Figure 5:
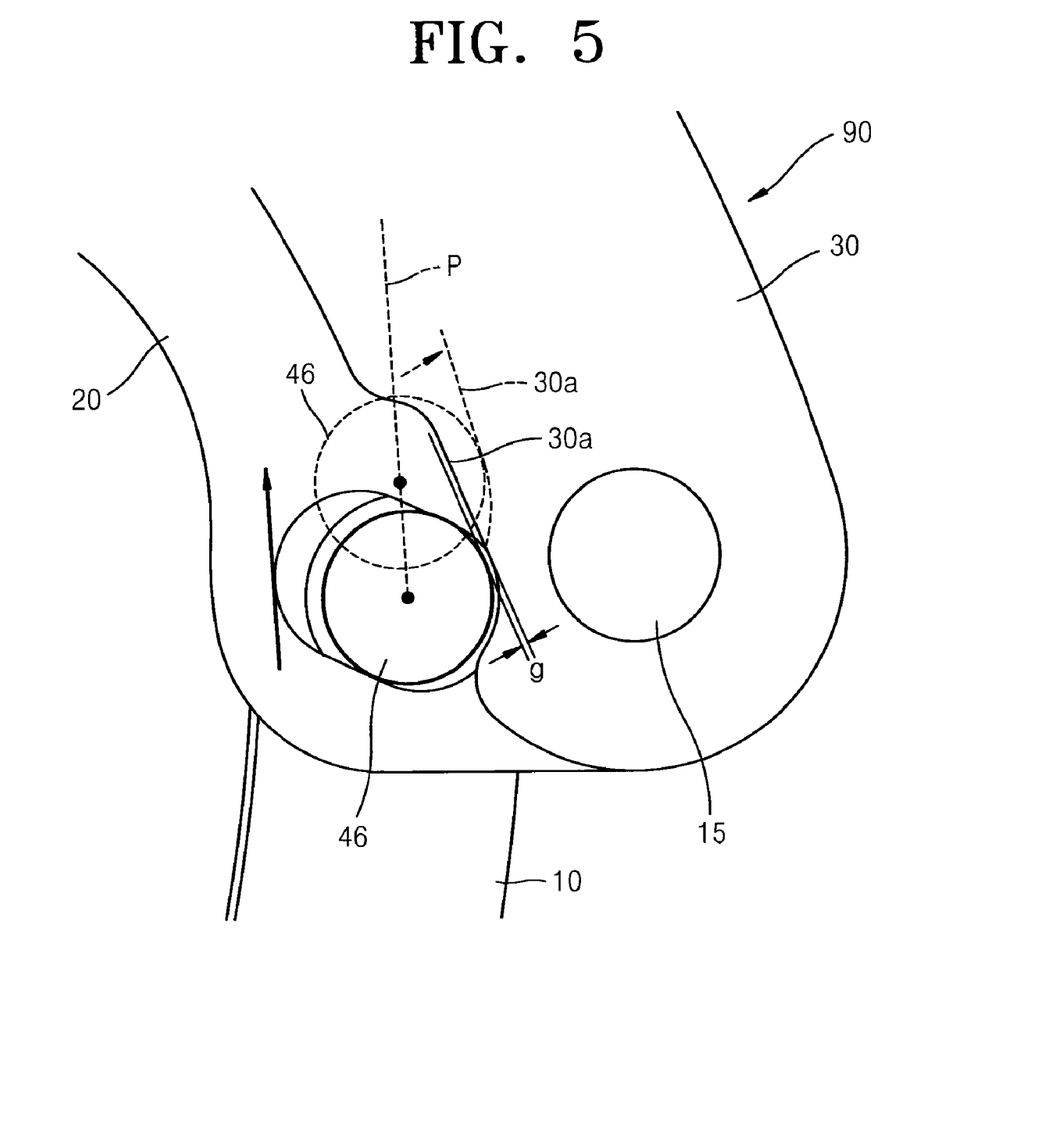
FIG. 5 is an enlarged view of a portion of the barrier vane of FIG. 4.

FIG. 5 is an enlarged view of a portion of the barrier vane 90 of FIG. 4. Referring to FIG. 5, a solid line and a dashed line of the power shaft 46 represent an arrangement of the power shaft 46 of the interlocking ring 40 and a notched edge 30a of the reacting vane 30. The solid line represents a case in which the optical pathway of the image of a subject is closed and the dashed line represents a case in which the optical pathway of the image of a subject is open. When the opening operation begins, the power shaft 46 moves along a predetermined movement trajectory P. That is, when the opening operation begins, the power shaft 46 moves, contacts the notched edge 30a of the reacting vane 30, and provides a rotary force to the reacting vane 30. Additionally, when the optical pathway of the subject is closed (see the solid line), the power shaft 46 and the notched edge 30a of the reacting vane are spaced apart from each other by a predetermined gap g, and when the optical pathway of the subject is open (see the dotted line), the power shaft 46 contacts the notched edge 30a of the reacting vane. This structure of the barrier vane 90 ensures that the reacting vanes 30 are located in an opening position, as will be described in detail now.

Figure 6:
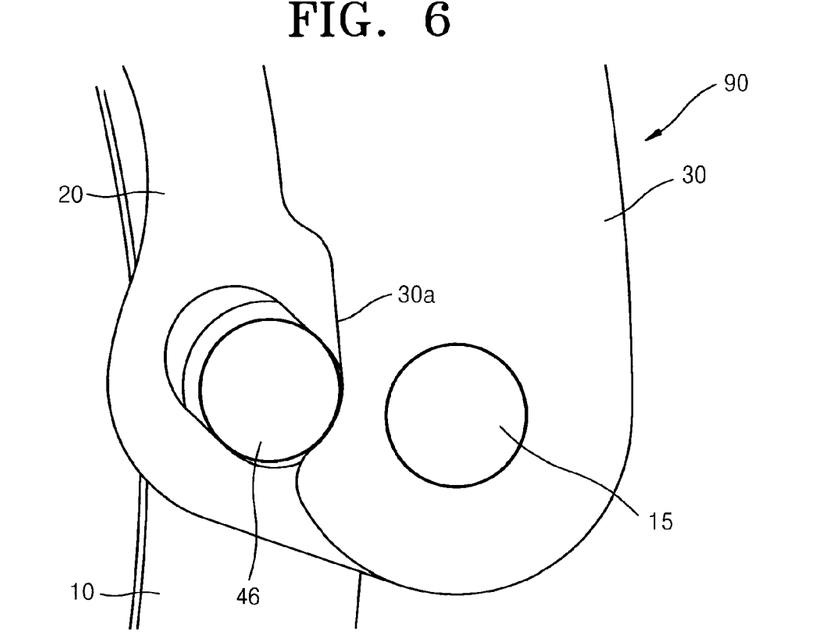
FIGS. 6 and 7 are views illustrating examples of arrangements of a reacting vane and a power shaft of the lens barrier apparatus of FIG. 1, when the optical pathway of a subject is open or closed, respectively.

FIG. 6 is a view illustrating an example arrangement of the reacting vane 30 and the power shaft 46 of the lens barrier apparatus of FIG. 1, when the optical pathway of the subject is open. Referring to FIG. 6, the reacting vane 30 is held in the opening position while contacting the power shaft 46 because the notched edge 30a of the reacting vane 30 contacts the power shaft 46. This structure may contribute to prevention of unintentional downward movement of the reacting vane 30 caused by the weight of the reacting vane 30 itself. An unintentional downward movement of the reacting vane 30 may cause the problem of shielding of a portion of the opening and a portion of the image of the subject. According to an embodiment, the reacting vane 30 receives a first binding force from the first projection 31 that is spaced apart from the rotary shaft 15 at a relatively long distance, and also receives a second binding force from the notched edge 30a of the reacting vane 30 that is spaced apart from the rotary shaft 15 at a relatively short distance. The first binding force is provided by the driving vane 20 in contact with the first projection 31, and the second binding force is provided by the power shaft 46 in contact with the notched edge 30a of the reacting vane 30. Additionally, the notched edge 30a of the reacting vane 30 may be smooth as illustrated in FIG. 6. However, in other embodiments, the notched edge 30a of the reacting vane 30 may also have any other shape that enables a stable contact with the rotary shaft 46.

Figure 7:
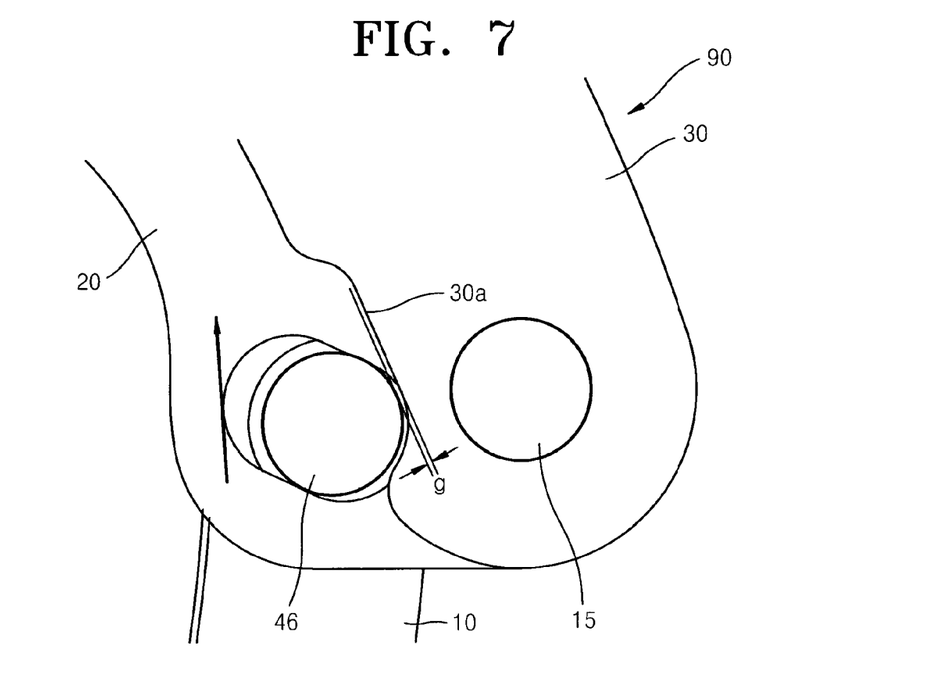

FIG. 7 is a view illustrating an example of an arrangement of the reacting vane 30 and the power shaft 46 of the lens barrier apparatus of FIG. 1 when the optical pathway of the subject is closed. Referring to FIG. 7, the reacting vane 30 is spaced apart from the power shaft 46 by a predetermined gap g. Due to the predetermined gap g between the reacting vane 30 and the power shaft 46, physical interception and mechanical abrasion caused by a small movement may be prevented in the closed state.

Figure 8:
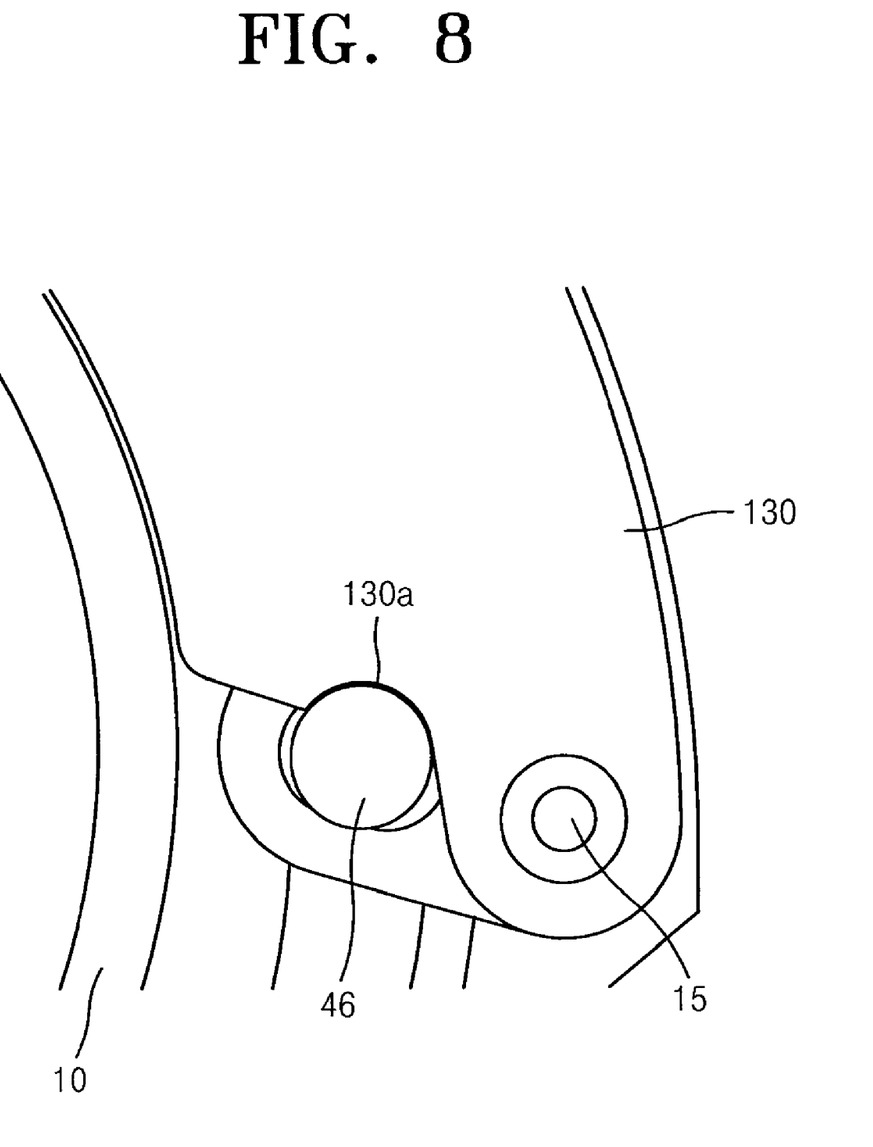
FIGS. 8 and 9 are views illustrating more examples of arrangements of a reacting vane and the power shaft of the lens barrier apparatus of FIG. 1, when the optical pathway of a subject is open or closed, respectively.
Figure 9:
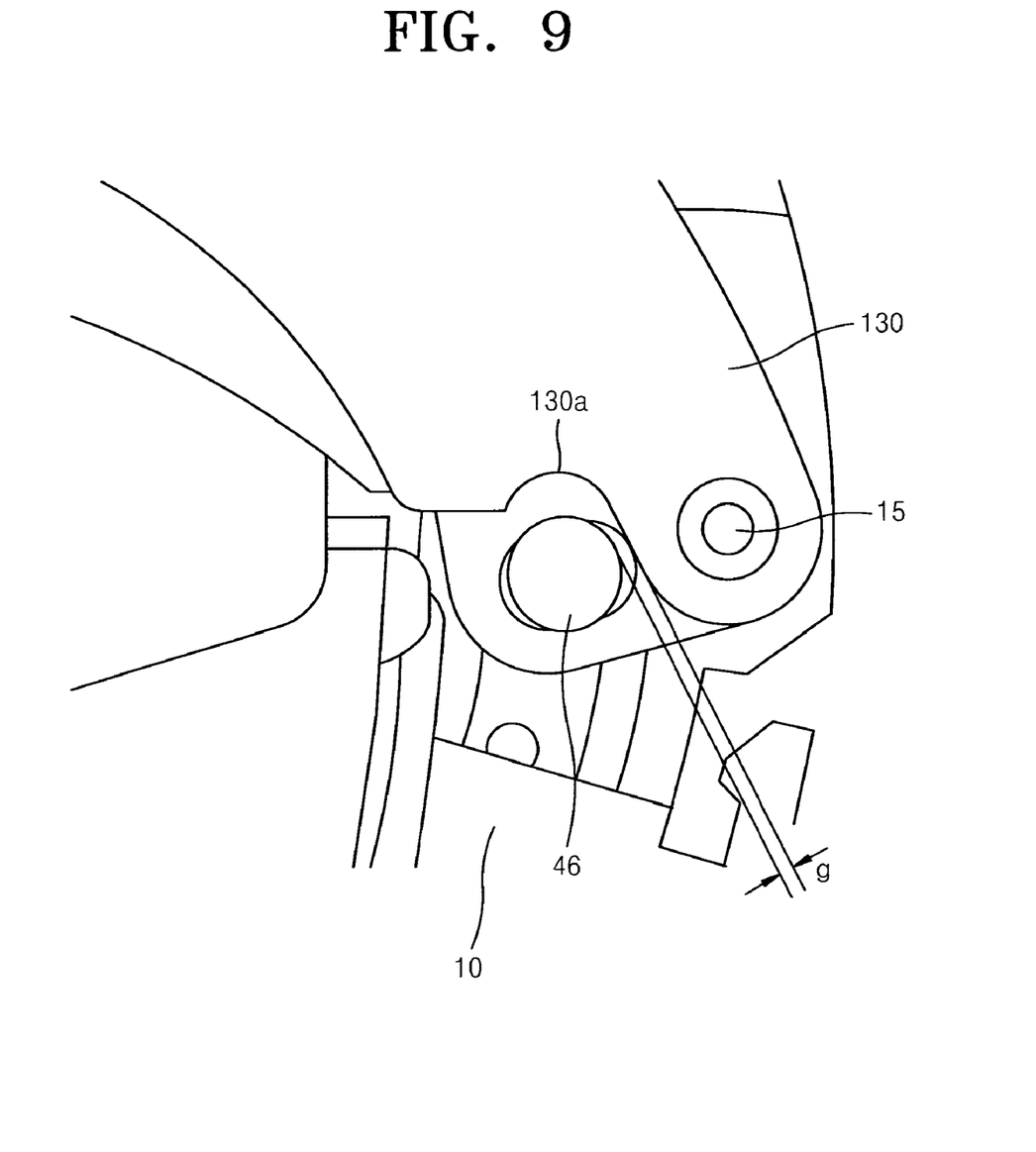

FIGS. 8 and 9 are views illustrating more examples arrangements of a reacting vane 130 and the power shaft 46 of the lens barrier apparatus of FIG. 1 when the optical path of the image of a subject is open, and closed, respectively. Referring to FIG. 8, the reacting vane 130 is forced to be located in the opening position while contacting the power shaft 46, for example, a bottom surface 130a of the reacting vane 130 contacts the power shaft 46. As described above, this structure may contribute to prevention of unintentional downward movement of the reacting vane 130 caused by weight of the reacting vane 130 itself and invasion into a portion of an effective viewing angle. In the present embodiment, the bottom surface 130a of the reacting vane 130 may have a concave shape matching the shape of the power shaft 46 and thus, more stably supports the reacting vane 130. Meanwhile, referring to FIG. 9, when the optical path of the image of a subject is closed, the reacting vane 130 is spaced apart from the power shaft 46 by a predetermined gap g. Due to the predetermined gap g between the reacting vane 130 and the power shaft 46, physical interception and mechanical abrasion caused by a small movement may be prevented in the closed state.

According to lens barrier apparatuses according to above embodiments of the present invention, a supporting structure of a barrier vane is constructed such that the barrier vane is forced to be located in an opening position by using a power shaft about which the barrier vane rotates and thus, invasion of the barrier vane into an effective viewing angle may be prevented.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A lens barrier apparatus comprising:
   a pair of driving vanes, each of which has a first hole and a second hole and each of which is configured to rotate about a respective rotary shaft inserted into the respective first hole to open and close an optical path while reacting to the movement trajectory of a respective power shaft inserted into the respective second hole; and
   a pair of reacting vanes which rotate between an open position and a closed position in synchronization with the pair of driving vanes,
   wherein, in the open position, the power shafts contact respective ones of the pair of reacting vanes.

2. The lens barrier apparatus of claim 1, wherein respective ones of the pair of driving vanes and the pair of reacting vanes are together assembled with the respective one of the rotary shafts, and the pair of driving vanes overlap with respective ones of the pair of reacting vanes.

3. The lens barrier apparatus of claim 1, wherein, in the closed position, the power shafts are spaced apart from the pair of reacting vanes.

4. The lens barrier apparatus of claim 1, wherein each of the pair of reacting vanes comprises:
   a first projection allowing the each of the pair of reacting vanes to rotate in synchronization with rotation of a corresponding driving vane of the pair of driving vanes when the corresponding driving vane rotates in an opening direction; and
   a second projection allowing the each of the pair of reacting vanes to rotate in synchronization with rotation of the corresponding driving vane when the corresponding driving vane rotates in a closing direction.

5. The lens barrier apparatus of claim 4, wherein, in the opening direction, the first projection of each reacting vane contacts the corresponding driving vane.

6. The lens barrier apparatus of claim 1, wherein the power shafts contact a notched edge of respective ones of the pair of reacting vanes.

7. The lens barrier apparatus of claim 1, wherein the power shafts contact a bottom surface of respective ones of the pair of reacting vanes.

8. The lens barrier apparatus of claim 1, wherein a portion of each of the reacting vanes which contacts the respective power shaft has a concave shape substantially matching the shape of the power shaft.

9. The lens barrier apparatus of claim 1, further comprising:
   a barrier base on which the rotary shafts are formed and which is fixedly mounted;
   an interlocking ring which is rotatably installed on the barrier base and on which the power shafts are formed; and
   a driving ring configured to drive the interlocking ring.

10. The lens barrier apparatus of claim 9, wherein the driving ring comprises an engaging portion, and the interlocking ring comprises a recess into which the engaging portion is inserted.

11. The lens barrier apparatus of claim 10, wherein the recess extends in a length longer than a length of the engaging portion so that the recess rotates with respect to the engaging portion in a predetermined angle range.

12. The lens barrier apparatus of claim 10, further comprising a closing spring interposed between the interlocking ring and the driving ring, wherein the closing spring provides an elastic bias to the engaging portion toward a first end position of the recess.

13. The lens barrier apparatus of claim 9, further comprising an opening spring interposed between the interlocking ring and the barrier base, wherein the opening spring provides an elastic bias to the interlocking ring in an opening direction.

14. A lens barrier apparatus comprising:
a barrier base on which a pair of rotary shafts are formed and which is fixedly mounted;
an interlocking ring which is rotatably installed on the barrier base and on which a pair of power shafts is formed;
a pair of driving vanes, each of which has a first hole and a second hole and each of which is configured to rotate about a corresponding rotary shaft of the pair of rotary shafts, which is inserted into the first hole, to open and close an optical path while reacting to the movement trajectory of a corresponding power shaft of the pair of power shafts, which is inserted into the second hole; and
a pair of reacting vanes which rotate between an open position and a closed position in synchronization with the pair of driving vanes;
wherein, in the open position, the pair of power shafts contacts respective ones of the pair of reacting vanes.

15. The lens barrier apparatus of claim 14, wherein respective ones of the pair of driving vanes and the pair of reacting vanes are together assembled with a respective one of the rotary shafts, and the pair of driving vanes overlaps with respective ones of the pair of reacting vanes.

16. The lens barrier apparatus of claim 14, wherein, in the closed position, the pair of power shafts is spaced apart from the pair of reacting vanes.

17. The lens barrier apparatus of claim 14, wherein a portion of each of the pair of reacting vanes, which contacts a respective one of the pair of power shafts, has a concave shape matching the shape of the respective one of the pair of power shafts.

18. The lens barrier apparatus of claim 14, further comprising a driving ring comprising an engaging portion, wherein the interlocking ring comprises a recess into which the engaging portion is inserted.

19. The lens barrier apparatus of claim 18, wherein the recess extends in a length longer than a length of the engaging portion so that the recess rotates with respect to the engaging portion in a predetermined angle range.

20. The lens barrier apparatus of claim 18, further comprising a closing spring interposed between the interlocking ring and the driving ring, wherein the closing spring provides an elastic bias to the engaging portion toward a first end position of the recess.

21. The lens barrier apparatus of claim 14, further comprising a driving ring for driving the interlocking ring in a closing direction.

22. The lens barrier apparatus of claim 14, further comprising an opening spring interposed between the interlocking ring and the barrier base, wherein the opening spring provides an elastic bias to the interlocking ring in an opening direction.

23. A lens barrier apparatus comprising:
a barrier base;
an interlocking ring configured to rotate with respect to the barrier base;
a pair of driving vanes, each of which is configured to be rotatably mounted to the barrier base via a first through hole of the driving vane, and each of which is configured to be rotatably moved from an open position to a closed position by movement of the interlocking ring, the interlocking ring engaging respective second through holes of each of the pair of driving vanes to rotatably move the pair of driving vanes; and
a pair of reacting vanes each of which is rotatably mounted to the barrier base, and each of which is configured to rotate from the closed position to the open position by movement of a respective driving vane of the pair of driving vanes.

24. The lens barrier apparatus of claim 23, wherein the pair of reacting vanes is configured to rotate from the closed position to the open position by movement of a respective driving vane of the pair of driving vanes and by movement of the interlocking ring.

25. The lens barrier apparatus of claim 23, wherein in the open position a pair of structures mounted to the interlocking ring is in contact with respective ones of the pair of reacting vanes to prevent the pair of reacting vanes from obstructing a portion of an opening formed by the open position.

26. A lens barrier apparatus comprising:
a barrier base;
an interlocking ring configured to rotate with respect to the barrier base;
a pair of driving vanes, each of which is configured to be rotatably mounted to the barrier base, and each of which is configured to be rotatably moved from an open position to a closed position by movement of the interlocking ring; and
a pair of reacting vanes each of which is rotatably mounted to the barrier base, and each of which is configured to rotate from the closed position to the open position by movement of a respective driving vane of the pair of driving vanes,
wherein in the open position a pair of structures mounted to the interlocking ring is in contact with respective ones of the pair of reacting vanes to prevent the pair of reacting vanes from obstructing a portion of an opening formed by the open position.

* * * * *